2,959,538
HYDRODESULFURIZATION OF WHOLE CRUDES

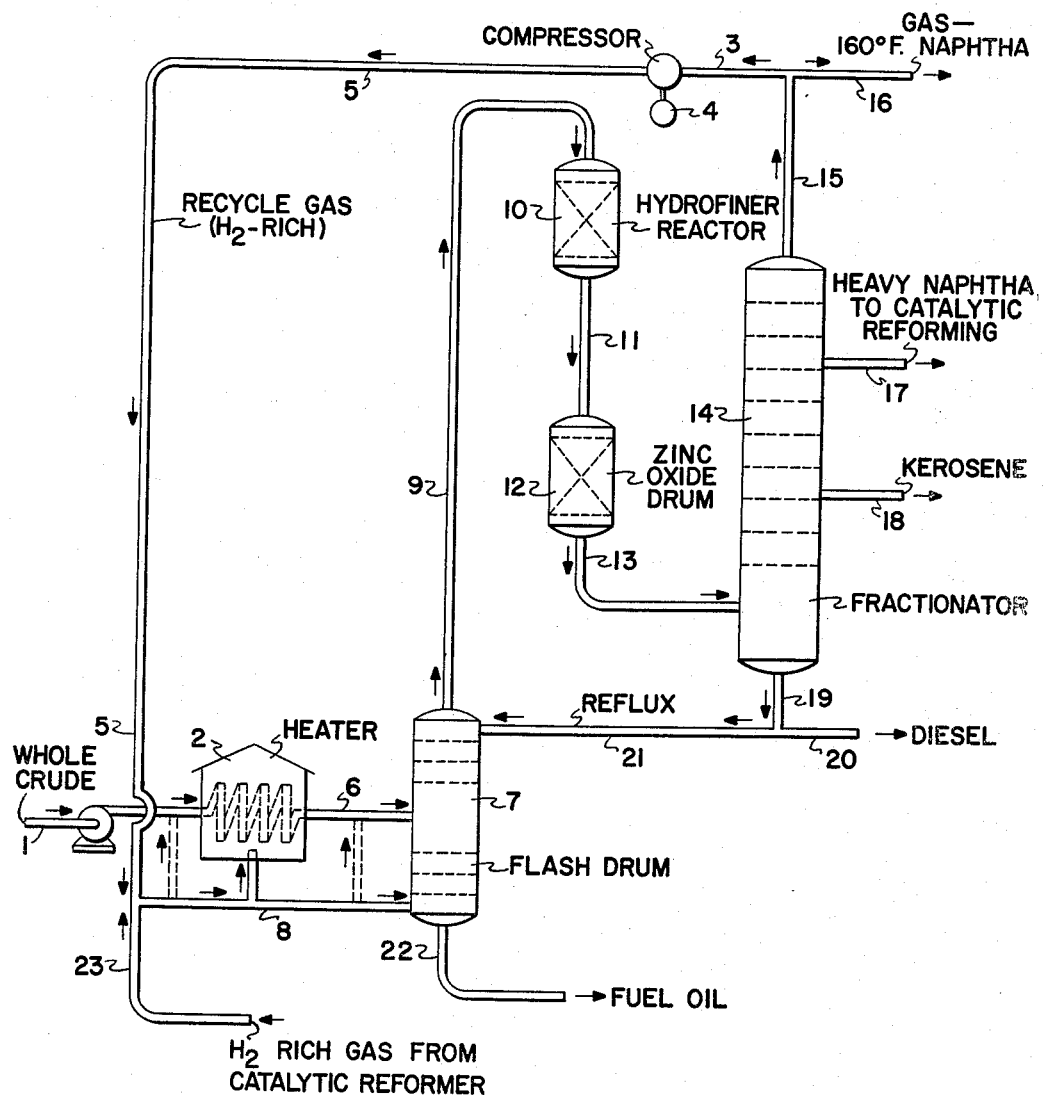

John Weikart, Westfield, and James D. Bushnell, Berkeley Heights, N.J., and George D. Ward, New York, and Robert S. Wood, Hartsdale, N.Y.; said Weikart, Bushnell, and Ward assignors to Esso Research and Engineering Company, a corporation of Delaware, and said Wood assignor to Standard-Vacuum Oil Company, a corporation of Delaware Filed Nov. 27, 1956, Ser. No. 624,617

10 Claims. (Cl. 208—211)

This invention relates to an improved process for distilling whole petroleum crudes and hydrodesulfurizing the portion containing naphtha, kerosenes and up to and through diesel oil fractions.

In the hydrofining of petroleum streams it had normally been considered desirable to segregate whole petroleum crudes into their component fractions and treating the components separately. This was done because it had been thought that the required operating conditions for the treating for each fraction were different. The separation preliminary to hydrofining followed by the treatment indicated can be quite costly.

This invention provides an improved process for hydrodesulfurizing wide boiling, whole crude petroleum feeds containing naphtha, kerosene and including diesel oil fractions. The method comprises heating this whole crude petroleum feed, flashing the feed through the diesel oil and lighter fractions in the presence of and aided by hydrogen, passing the resultant vapors including the diesel oil and lighter fraction preferably together with hydrogen to a hydrofining zone where the entire cut is hydrofined. The hydrofined vapors are then fractionated to separate the desired components. The various treating steps are preferably conducted at substantially the same superatmospheric pressures. Preferably also the vaporous and gaseous materials from the hydrofining are contacted with zinc oxide to convert the hydrogen sulfide to water and zinc sulfide prior to the fractionation of the gases and vapors.

The whole crude petroleum feeds treated in this invention as stated previously run from the crude gas and naphtha fraction through e.g. 700° F. diesel oil fractions and higher. Typical crude sulfur-containing feeds of this nature thus are, domestic, middle east and light South American.

The hydrofining catalysts that can be employed in the hydrofining include 5–15% molybdena oxide on activated alumina, mixtures of cobalt oxides (3–6 wt. %) and molybdenum oxides (6–12 wt. %), cobalt molybdate on activated alumina, and other sulfur resistant hydrogenation catalysts.

The hydrogen-containing gas that is used in the process consists partially of fresh hydrogen gas that is added to the system and partially recycled gas from the desulfurization step. The fresh hydrogen gas can be mixed with non-interfering diluents such as hydrocarbons or inerts and can be derived from other refinery sources such as from catalytic reforming units.

The proposed system is operated with the heating zone, flash zone, hydrofiner, zinc oxide treater and principal fractionator at substantially the same superatmospheric pressures. The term "substantially the same" is intended to include the somewhat lower pressures encountered in the successive units as one proceeds downstream because of the normal downhill effect. The pressures utilized are conveniently in the range of 100 to 1000 p.s.i.g.

This invention will be better understood by reference to an example and the flow diagram shown in the drawing.

This example is for treating a whole Aramco crude having the following inspection including sulfur content:

ARAMCO CRUDE

| | |
|---|---|
| °API gravity | 35.0 |
| Wt. percent sulfur | 1.9 |
| TBP dist.: | |
| LV percent off at— | |
| 200 | 10 |
| 300 | 20 |
| 400 | 30 |
| 500 | 40 |
| 600 | 50 |
| 700 | 60 |

Referring now to the attached flow plan, the liquid whole crude enters the system through line 1 and at a pressure of 430 p.s.i.g. is pumped into the furnace 2. Hydrogen-containing gas from line 3 passes through compressor 4 and line 5 and is admixed with the feed in the furnace. The hydrogen-containing gas can alternatively be admixed with the feed part way through or after it leaves the furnace and also enters through line 23. The feed is heated in the furnace to a temperature of 800° F. at a pressure of 225 p.s.i.g. The resulting mixture of liquid, vapor and gaseous hydrogen is then sent through line 6 into flash drum 7. Additional hydrogen-containing gas which can be recycled from elsewhere in the system or other systems is injected through line 8 into the lower portion of flash drum 7. This lowers the partial pressure of the crude in the drum so that 700° F. minus material including the diesel oil is vaporized through line 9. The pressure in the flash drum is about 220 p.s.i.g. The flash drum may be refluxed to prevent entrainment of heavy ends into the diesel cut.

The vaporous material which includes light gases, naphthas, kerosenes, and up to and including diesel plus gaseous hydrogen is passed directly without further treating to hydrofiner 10 through line 9. Hydrofiner 10 is at a pressure of 210 p.s.i.g. and a temperature of 735° F. and contains as the catalyst 10% cobalt molybdate on activated alumina. Two or more swing hydrofiner reactors can be used but one is shown for simplicity.

The hydrofined products then leave through line 11 where they enter zinc oxide drum 12 which is at a pressure of 200 p.s.i.g. Hydrogen sulfide present as a result of the hydrofining is converted to $H_2O$ and zinc sulfide. Two or more swing zinc oxide drums can be utilized but for simplicity only one is shown.

Desulfurized hydrocarbon and hydrogen vapors and gases are passed through line 13 to fractionator 14. Fractionator 14 is at a pressure of 190 p.s.i.g. Fractionator 14 can be constructed integrally with the flash drum 7 but is shown here as a separate unit. From fractionator 14 a light virgin naphtha now containing 0.0005 wt. percent sulfur is withdrawn through lines 15 and 16, a naphtha suitable for a catalytic reformer feed, e.g., having a boiling point in the range of 160° to 350° F. and containing 0.001 wt. percent sulfur is withdrawn through line 17 and a kerosene and/or jet fuel having 0.02 wt. percent sulfur through line 18. A diesel oil fraction is withdrawn as a bottoms fraction through lines 19 and 20 and contains 0.5 wt. percent sulfur. Gaseous hydrogen separated by means of a scrubber, not shown, is withdrawn through lines 15, 3 and 5 for reutilization in the process as previously shown. A portion of the diesel fuel can be withdrawn through lines 19 and 21 for utilization as reflux in flash drum 7.

The bottoms fuel oil from the flash drum 7 are withdrawn through line 22. It can be sent to a steam stripper for flash correction.

Regeneration of the fixed bed of hydrodesulfurization catalyst may be required periodically, depending largely upon the nature of the feed stock. This regeneration is conveniently carried out at a temperature of 600° to 1050–1100° F. with an oxygen-containing gas.

The zinc oxide contacting is also done in a fixed bed operation with zinc oxide particles conveniently having a diameter distribution of ⅛ inch to ½ inch. It is necessary from time to time to regenerate the zinc sulfide formed back to zinc oxide, and this is conveniently done at a temperature in the range of 1000° to 1800° F. by passing oxygen-containing gas through the bed.

In order to explain the process more fully, the following conditions of operation of the hydrofiner are set forth below.

*Conditions in hydrofiner*

|  | Broad Range | Preferred Range |
|---|---|---|
| Temperature, ° F | 500–800 | 650–750 |
| Pressure, p.s.i.g | 100–400 | 200–300 |
| Feed Rate, v/hr./v | 0.5/16+ | 1–4 |
| $H_2$ Treat, s.c.f./b | 200–3,500 | 500–1,000 |
| $H_2$ Consumption, s.c.f./b | 10–1,000 | 50–150 |

Conditions in the zinc oxide drum are substantially the same except for the lower feed rate.

The advantages of this process will be apparent to the skilled in the art. Real economies in operation are effected because of the reduced amount of equipment required and operating cost as contrasted to a segregation of a whole crude into its components prior to hydrofining. Corrosion problems are avoided.

Other metal oxides besides zinc oxide can be used for $H_2S$ removal such as the oxides of Ca, Ba, Fe, Mn, Ni, Cu, Co, Mo and Na. Because of, among other qualities, its reduction resistant properties, ZnO is particularly effective and preferred.

Other gases besides hydrogen can be utilized in the flashing operation, e.g. steam, methane, propane, butane, etc. and mixtures of gases as typically found in refinery streams.

It is to be understood that this invention is not limited to the specific examples which have been offered merely as illustrations and that modifications may be made without departing from the spirit of the invention.

What is claimed is:

1. A process for hydrodesulfurizing a wide boiling whole crude petroleum oil feed containing naphtha, kerosene and diesel oil fractions which comprises the steps of heating the whole crude feed; flashing the heated feed at superatmospheric pressure in the presence of hydrogen; passing all of the resultant vapors of the diesel oil fraction and lighter together with gaseous hydrogen directly to a hydrofining zone; hydrofining the total vapors in the hydrofining zone; and fractionating the hydrofined vapors and gases to separate desired products, the various steps after heating being at substantially the same superatmospheric pressure.

2. The process of claim 1 including the additional step of contacting the effluent gases and vapors from the hydrofining step with zinc oxide to remove hydrogen sulfide prior to the fractionation step.

3. The process of claim 1 in which the superatmospheric pressures are in the range of about 100 to 1000 p.s.i.g.

4. The process of claim 1 in which the hydrogen gas is added to the feed prior to the heating step.

5. The process of claim 1 in which the hydrogen gas is added to the feed during the heating step.

6. The process of claim 5 in which additional hydrogen gas is added to the flashing step.

7. The process of claim 1 in which the hydrogen gas is added to the feed after the heating step.

8. The process of claim 1 including the additional step of withdrawing a liquid fuel bottoms fraction from the flashing step.

9. The process of claim 1 including the additional step of recycling hydrogen from the fractionating step for use in the flashing step.

10. The process of claim 9 including the additional step of recycling a bottoms diesel fraction from the fractionating step for reflux in the flashing step.

References Cited in the file of this patent

UNITED STATES PATENTS

| 487,119 | Frasch | Nov. 29, 1892 |
| 2,357,121 | Lovell | Aug. 29, 1944 |
| 2,606,141 | Meyer | Aug. 5, 1952 |
| 2,769,760 | Annable et al. | Nov. 6, 1956 |
| 2,775,544 | Corneil et al. | Dec. 25, 1956 |